(12) United States Patent
Forbes et al.

(10) Patent No.: US 11,329,809 B2
(45) Date of Patent: May 10, 2022

(54) METHOD AND SYSTEM FOR HYBRID CLASSICAL-QUANTUM COMMUNICATION

(71) Applicant: UNIVERSITY OF THE WITWATERSRAND, JOHANNESBURG, Johannesburg (ZA)

(72) Inventors: Andrew Forbes, Johannesburg (ZA); Bienvenu Ndagano, Johannesburg (ZA); Isaac Nape, Johannesburg (ZA); Mitchell Cox, Johannesburg (ZA); Carmelo Rosales-Guzman, Johannesburg (ZA)

(73) Assignee: UNIVERSITY OF THE WITWATERSRAND, JOHANNESBURG, Johannesburg (ZA)

( * ) Notice: Subject to any disclaimer, the term of this patent is extended or adjusted under 35 U.S.C. 154(b) by 135 days.

(21) Appl. No.: 16/480,008

(22) PCT Filed: Jan. 23, 2018

(86) PCT No.: PCT/IB2018/050397
§ 371 (c)(1),
(2) Date: Jul. 23, 2019

(87) PCT Pub. No.: WO2018/134799
PCT Pub. Date: Jul. 26, 2018

(65) Prior Publication Data
US 2019/0394030 A1    Dec. 26, 2019

(30) Foreign Application Priority Data
Jan. 23, 2017  (ZA) .................................. 2017/00507

(51) Int. Cl.
*H04B 10/70* (2013.01)
*H04L 9/08* (2006.01)
(Continued)

(52) U.S. Cl.
CPC ........... *H04L 9/0852* (2013.01); *H04B 10/50* (2013.01); *H04B 10/66* (2013.01); *H04B 10/70* (2013.01)

(58) Field of Classification Search
CPC ............................ H04B 10/70; H04L 9/0852
See application file for complete search history.

(56) References Cited

U.S. PATENT DOCUMENTS

2005/0180575 A1*  8/2005  Maeda .................. H04L 7/0075
                                                    380/278
2008/0137858 A1*  6/2008  Gelfond ................ H04L 9/0852
                                                    380/256
(Continued)

OTHER PUBLICATIONS

Qi et al. "Feasibility of quantum key distribution through dense wavelength division multiplexing network," arxiv.org, Cornell University Library, 201 Olin Library Cornell University Ithaca, NY 14853, Jun. 2010, 18 pages.
(Continued)

*Primary Examiner* — Nathan M Cors
(74) *Attorney, Agent, or Firm* — Sheridan Ross P.C.

(57) ABSTRACT

This invention relates generally to a method and system for hybrid classical-quantum communication. The method comprises transmitting a single photon having a particular quantum state over a communication medium using a quantum mode set; and transmitting a classical light beam over the same communication medium using a classical mode set, wherein the classical and quantum mode sets comprise non-separable modes in common. The non-separable modes in common may be two degrees of freedom of a single photon or classical light and may thus be spatial modes in
(Continued)

one or more indexes, and polarisation. The invention relates also to a system to implement the method accordingly.

19 Claims, 3 Drawing Sheets

(51) Int. Cl.
  *H04B 10/50* (2013.01)
  *H04B 10/66* (2013.01)

(56) References Cited

U.S. PATENT DOCUMENTS

2016/0233964 A1* 8/2016 Frohlich ............ H04B 10/2581
2016/0234018 A1* 8/2016 Frohlich ............... H04L 9/0852
2019/0109651 A1* 4/2019 Su ......................... H04B 10/70

OTHER PUBLICATIONS

International Search Report and Written Opinion prepared by the European Patent Office dated Mar. 2, 2018, for International Application No. PCT/IB2018/050397.

Aiello et al. "Quantum-like nonseparable structures in optical beams," New Journal of Physics, 2015, vol. 17, No. 4, Article 043024.

Official Action for European Patent Application No. 18702818.8, dated May 11, 2020, 5 pages.

* cited by examiner

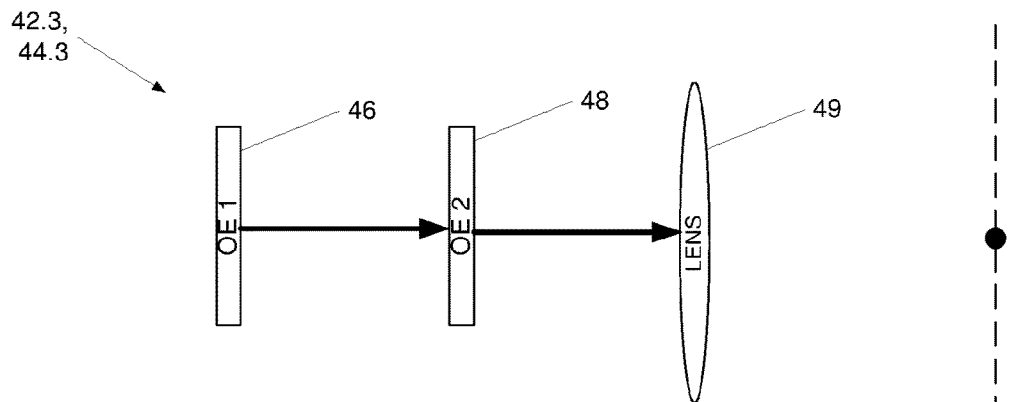
FIGURE 5
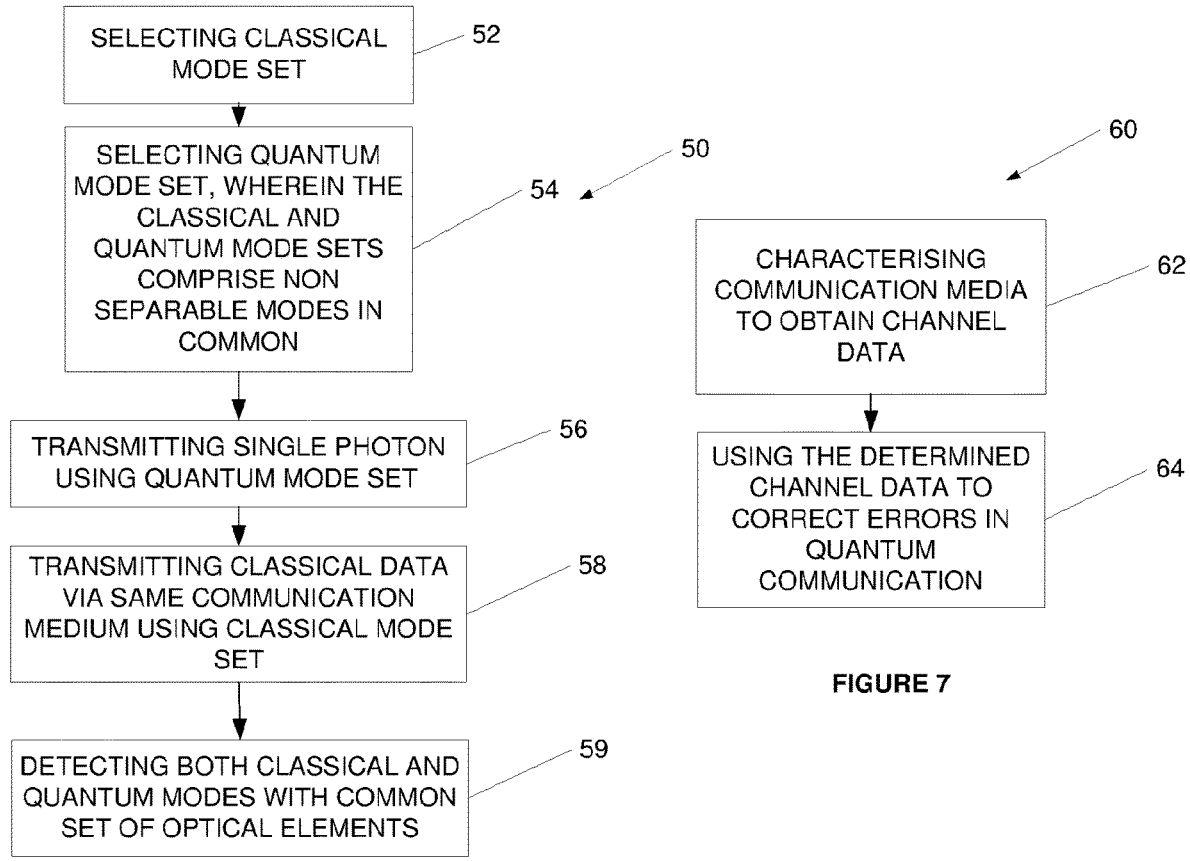
FIGURE 6
FIGURE 7

METHOD AND SYSTEM FOR HYBRID CLASSICAL-QUANTUM COMMUNICATION

CROSS REFERENCE TO RELATED APPLICATIONS

This application is a national stage application under 35 U.S.C. 371 and claims the benefit of PCT Application No. PCT/IB2018/050397 having an international filing date of 23 Jan. 2018, which designated the United States, which PCT application claimed the benefit of South Africa Application No. 2017/00507 filed 23 Jan. 2017, the disclosures of which are incorporated herein by reference in their entirety.

FIELD OF INVENTION

THIS INVENTION relates to a method and system for hybrid classical-quantum communication, or data exchange.

BACKGROUND OF THE INVENTION

Information transfer is one of the key challenges of the digital age. In essence, it can be reduced to the following question: How fast and how securely can we transfer and process information between remote parties? In particular, the challenge is, sending high volumes of encoded information while preventing attacks from eavesdroppers.

On one hand, temporal encoding (switching between 0s and 1s in the time domain) allows for high speed transmission (in the gigabits range). The capacity of communication links can be further increased through multiplexing; that is, sending multiple streams of data over the same link. The more independent channels can be multiplexed, the higher the capacity of the link. Employing spatial modes of light has shown considerable improvements in data transfer of classical communication systems through spatial multiplexing, "classical" here meaning many photons of the same light. In principle, the spatial degree of freedom (DoF) possesses an infinite number of channels that can carry independent streams of data, making spatial modes of light an excellent candidate to achieve high-speed long distance communication. While attention has focused on orbital angular momentum (OAM), it will be appreciated that there is no restriction on the mode type selected for the purposes of spatial multiplexing. Mode in this context refers to the spatial distribution of the electric field, light being an electromagnetic wave, and may include an amplitude, phase and polarisation that takes on some function across the wave.

On the other hand, the security of a communication link is ensured through the implementation of cryptographic protocol. Unlike many classical encryption protocols that are based on numerical methods, quantum cryptography relies solely on the counter-intuitive properties of quantum particles, particularly photons. Through the process of quantum key distribution (QKD), an encryption is generated between two parties through preparation and measurements of quantum states (typically two-dimensional states). While quantum cryptography allows for, in principle, unconditional security, the rate at which quantum keys are generated is typically very low. To this end, the implementation of quantum key distribution with larger alphabet offers the possibility of encoding more bits for every photon, while increasing the security of the protocol.

Presently the two communication modalities are treated as distinct entities with independent design criteria and independent communication links, i.e., the information is sent separately and not across a common link.

It is therefore an object of the present invention to provide a communication system that allows information to be sent both classically and in the quantum using the same link.

SUMMARY OF THE INVENTION

According to a first aspect of the invention, there is provided a method for hybrid classical-quantum communication, or data exchange, the method comprising:
  transmitting a single photon having a particular quantum state over a communication medium using a quantum mode set; and
  transmitting a classical light beam over the same communication medium using a classical mode set,
  wherein the classical and quantum mode sets comprise non-separable modes in common.

The classical mode set may comprise non-separable modes for classical communication, and wherein the quantum mode set may comprise non-separable modes for quantum communication. The method may comprise a prior step of selecting a classic mode set for classical communication over a communication medium; and selecting a quantum mode set for quantum communication over the communication medium, wherein the classical and quantum mode sets comprise non-separable modes in common.

The non-separable modes in common are or are based on two degrees of freedom of the quantum state of a single photon, and classical light. As mentioned herein, the degrees of freedom may be polarisation, spatial mode in one or more indexes, and wavelength.

The non-separable modes may be selected such that resulting classical and quantum modes to be used for classical and quantum communication are natural modes of the communication medium.

The classical mode set may have two degrees of freedom, at least a first degree of freedom in common with the quantum mode set, and a second degree of freedom. The first degree of freedom may be a spatial mode in one or more index, and the second degree of freedom may be polarisation, or vice versa. Spatial mode in one or more index may be, for example, orbital angular momentum (OAM), Hermite-Gaussian modes, and so on The second degree of freedom of the classical mode set may be invariant to perturbations associated with the communication medium. In some example embodiment, the classical mode set may have both first and second degrees of freedom in common with the quantum mode set.

The quantum mode set may be selected from a group of modes from a Hilbert space spanned by the first and second degrees of freedom of the classical mode set such that the first degree of freedom forms orthogonal modes and combined first and second degrees of freedom form mutually unbiased modes, or vice versa.

In one example embodiment, the first degree of freedom may be orbital angular momentum (OAM), and the second degree of freedom may be polarisation. In this way, the classical light beam may be in the form of various vector vortex beams, of which there are an infinite number, while the single photons may be transmitted via scalar (separable) and vector OAM (non-separable) modes. However, as mentioned herein any non-separable degrees of freedom may be selected for the modes.

The first and second degrees of freedom of both the classical and quantum mode sets may be polarisation and spatial mode in one or more indexes.

In one example embodiment, the non-separable modes may be the vector modes in common to both the classical and quantum mode sets.

The method may comprise attenuating a light source of the transmitted classical light beam to transmit the single photon via the quantum mode set prior to transmission of the classical light beam, wherein the classical light beam comprises classical data bits.

The method may comprise transmitting a plurality of photons having particular quantum states before, during, and/or after transmitting classical data bits in a predetermined fashion via the quantum mode set.

The method may comprise transmitting a quantum bit indicative of the quantum state of the single photon over the communication medium for Quantum Key Distribution (QKD).

The method may comprise using the classical light beam to characterise the communication medium by determining channel data associated therewith, and wherein the method may comprise using the determined channel data to correct errors in quantum communication over the communication medium.

The error correction may be done in real-time, or substantially real time by virtue of the selection of the two DoF in the classical and quantum mode set. Typically the classical communication may be done in a vector state/s which allows for the real-time error correction of quantum communication in the same channel which permits for a lower error rate corresponding to a faster key transfer period.

The method may comprise transmitting both the classical and quantum modes with a common set of optics that is able to generate the non-separable modes in common with both degrees of freedom and separable modes associated with one degree of freedom on demand.

The classical mode set may comprise non-separable and/or separable modes for classical communication, and wherein the quantum mode set comprises non-separable and/or separable modes for quantum communication.

The method may comprise detecting both the classical and quantum modes with a common set of detection optics that is able to distinguish the non-separable modes and the separable modes from each other.

The method may comprise controlling a receiver arrangement to detect the transmitted photon in a predetermined manner.

The method may comprise directing an incoming classical light beam or single photon to scalar and vector processing paths, wherein in the scalar processing path the method comprises:
  converting linear polarisation of the incoming classical light beam or single photon to circular polarisation;
  splitting the circularly polarised classical light beam or single photon to two scalar paths based on geometric phase with a suitable polarisation grating; and
  sorting scalar modes from outputs of the polarisation grating with one or more suitable mode sorters so as to detect scalar modes;
  and wherein in the vector processing path, the method comprises:
  splitting or directing the classical light beam or single photon into two paths based on their polarisation using one or a combination of waveplate/s, polarizing beam splitters, and suitable polarisation grating/s based on geometric phase;
  interfering the two paths with a beam splitter; and
  sorting resulting modes from outputs of the beam splitter with suitable mode sorters so as to detect vector modes.

According to a second aspect of the invention, there is provided a communication system comprising a transmitter arrangement, wherein the transmitter arrangement is configured to:
  transmit a single photon having a particular quantum state over a communication medium using a quantum mode set; and
  transmit a classical light beam over the same communication medium using a classical mode set, wherein the classical and quantum mode sets comprise non-separable modes in common.

The classical mode set may comprise non-separable modes for classical communication, and wherein the quantum mode set comprises non-separable modes for quantum communication.

The non-separable modes in common may be non-separable degrees of freedom of selected modes of the quantum and classical mode sets used for quantum and classical communication.

The classical mode set may comprise non-separable and/or separable modes for classical communication, and wherein the quantum mode set comprises non-separable and/or separable modes for quantum communication.

The system may comprise a receiver arrangement configured to receive a transmitted single photon and classical beam of light transmitter by the transmitter arrangement and detect both classical and quantum modes with a common set of detection optics.

The transmitter arrangement may comprises a classical transmitter configured to transmit data over the communication medium via a classical light beam comprising classical data.

The transmitter arrangement may be configured to transmit the single photon with a particular quantum state before, during, and/or after transmission of the classical light beam.

The transmitter arrangement may comprise a light source for transmitting a classical light beam and a single photon via the same communication medium.

The transmitter arrangement may be configured to attenuate the light source to transmit a single photon.

The receiver arrangement may comprise a first 50% reflecting beam splitter configured to direct an incoming classical light beam or single photon to scalar and vector processing paths.

The receiver arrangement may comprise, in the scalar processing path:
  a quarter wave plate in the scalar processing path to convert linear polarisation of an incoming classical light beam or single photon to circular polarisation.
  a polarisation grating, located downstream of the quarter wave plate, configured to split the circularly polarised classical light beam or a single photon to two scalar paths based on geometric phase; and
  suitable scalar mode sorters configured to sort scalar modes from outputs of the polarisation grating.

The receiver arrangement may further comprise, in the vector processing path:
  one or a combination of waveplate/s, polarizing beam splitters, and suitable polarisation grating/s based on geometric phase configured to split the classical light beam or single photon into two vector paths based on geometric phase;
  a beam splitter configured to intercept outputs from the polarisation grating; and
  suitable mode sorters configured to sort vector modes from outputs of the beam splitter so as to detect vector modes.

In one example embodiment, the mode sorters in both the vector and scalar processing paths may be substantially similar. In particular, the mode sorters may be refractive optical elements that map OAM to position. In one example embodiment, the mode sorter may comprise:
- a first optical element configured to perform conformal mapping in Cartesian co-ordinates from a received input;
- a second optical element operable to correct phase of the output from the first optical element; and
- a third optical element in a form of a Fourier transforming lens configured to map the output of the second optical element to output positions.

BRIEF DESCRIPTION OF THE DRAWINGS

FIG. 4 (d) shows, graphically, example embodiments input states mapped at the detector of FIG. 4 (a-c);

FIG. 4 (e) shows graphs illustrating experimental data of the performance of the detector of FIG. 4 (a-c);

FIG. 5 shows a schematic diagram of an example embodiment of a mode sorter in accordance with an example embodiment of the invention;

FIG. 6 shows a high level block diagram of a method in accordance with an example embodiment of the invention; and FIG. 7 shows another high level block diagram of a method in accordance with an example embodiment of the invention.

DETAIL DESCRIPTION OF THE DRAWINGS

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof. Moreover, it will be understood that unless otherwise specified, the operation of the various components with the same labels will be the same if not substantially similar.

Figure 1:
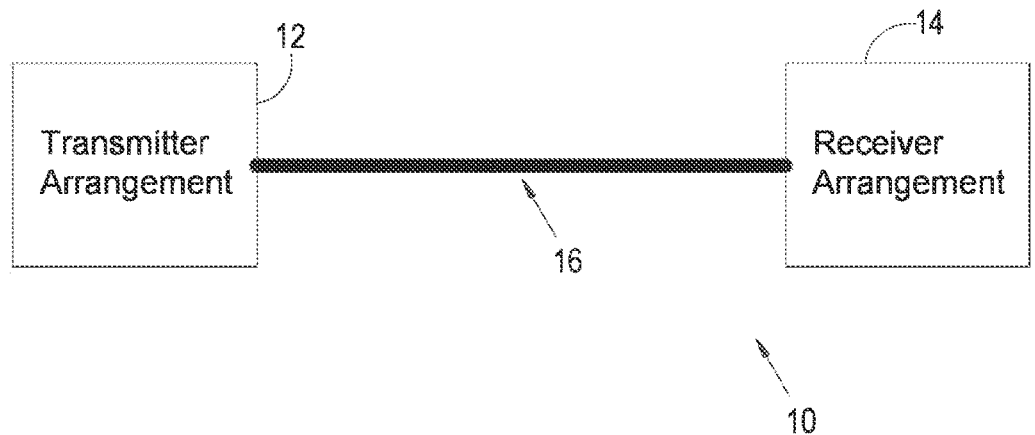
FIG. 1 shows a high level schematic block diagram of a hybrid classical-quantum communication system in accordance with an example embodiment of the invention.

Referring to FIG. 1 of the drawings where a high level hybrid classical-quantum communication system, for example, using spatial modes of light in accordance with an example embodiment of the invention is generally indicated by reference numeral 10. The system 10 is typically comprised of a transmitter arrangement 12, and a spaced apart receiver arrangement 14, wherein the transmitter arrangement 12 is configured to communicate data over a communication medium 16 to the receiver arrangement 14. The communication medium 16 may be a communication link between the arrangements 12, 14 and may be free space. However, it will be appreciated that in some example embodiments, the communication medium 16 may be in the form of an optical fibre link, underwater links, etc.

The transmitter arrangement 12 is configured to perform both classical transmission of data, i.e., the transmission of classical bits of data via classical beams of light, and quantum transmission of data, i.e., the transmission of single photons for QKD over the same communication medium 16 thereby obviating the need to have separate channels therefor. In the same vein, it will be appreciated that the receiver arrangement 14 is arranged to detect both classical beams of light comprising classical bits of data and single photons transmitted by the arrangement 12 over the communication medium 16 in a manner which will be discussed in greater detail below.

Figure 2:
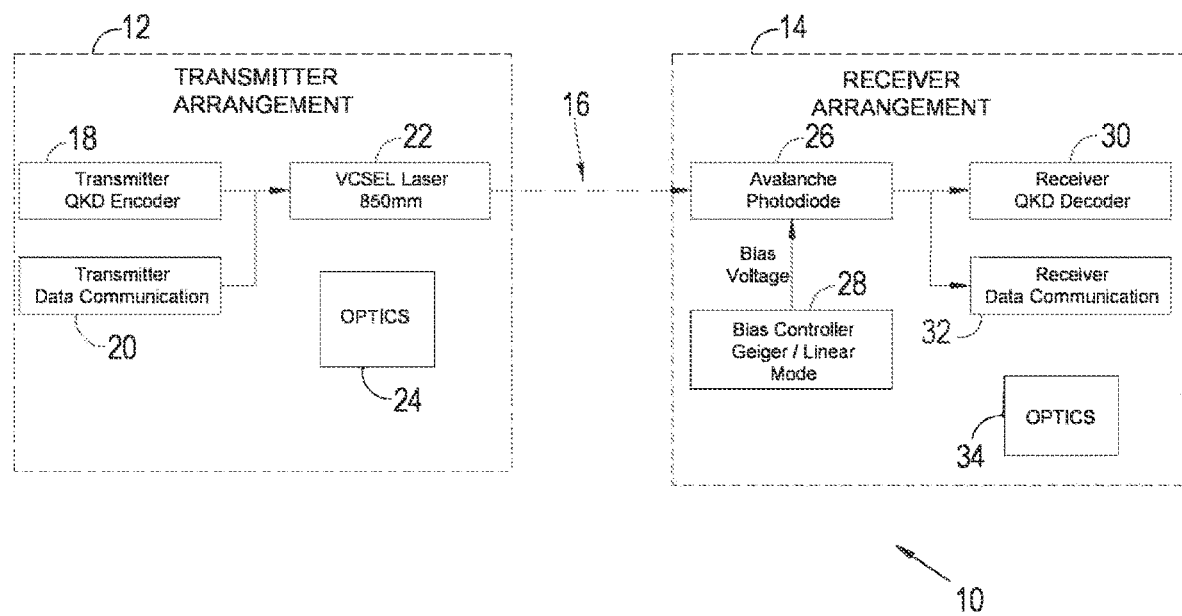
FIG. 2 shows another schematic block diagram of the hybrid classical-quantum communication system of FIG. 1 in greater detail in accordance with one example embodiment of the invention.

Referring now also to FIG. 2 of the drawings where the system 10 is illustrated in further detail. In one example embodiment, the arrangement 12 may comprise a QKD encoder 18, a classical data transmitter 20, and a suitable light source 22. Though illustrated in block format, it will be understood by those skilled in the field of invention that the transmitter arrangement 12 may comprise one or more suitable optical elements or optics 24 configured to generate, or encode data to be transmitted by the arrangement 12 into, various modes, as will be discussed below.

As mentioned above, the term "modes" in the context of the specification refer to spatial modes of light. In particular, a mode in this context refers to the spatial distribution of the electric field, light being an electromagnetic wave, and may include an amplitude, phase and polarisation that takes on some function across the wave. If the polarisation pattern is constant across the field then we refer to this as a scalar mode, whereas if it varies it is referred to as a vector mode. Similarly the amplitude and phase may vary across the field's cross-sectional area (the transverse plane, usually denoted in co-ordinates (x,y)) following some function, F(x,y), and this function may be used to group such variations into "mode sets". For example, if the phase varies azimuthally then we may refer to such modes as vortex modes, or orbital angular momentum modes. If the amplitude varied following a Hermite-Gaussian function we may refer to the set as a Hermite-Gaussian mode set, and so on. Since classical light implies many photons one may consider the sum of all of them as a "beam", and in this sense the classical mode set would represent some beam of light with a particular spatial distribution, e.g., a vortex beam or vector beam. However, in the quantum realm there is no beam of light, only single photons, and here the mode then takes on the meaning of the quantum state of that photon of light.

Though not illustrated, it will be noted that the transmitter arrangement 12, and the receiver arrangement 14 for that matter, may comprise suitable electronics, circuitry, drivers, processors, and the like configured to control operation of the arrangement 12. However, these will not be discussed in greater detail herein.

The QKD encoder 18 may be configured to transmit or facilitate the transmission of a single photon having a particular quantum state, or a quantum bit (qubit), over the communication medium 16 for QKD at the receiver arrangement 14 so that the security of transmitted data is maintained (i.e., from "Alice" to "Bob" without eavesdropping by "Eve"). In other words, quantum communication. In some example embodiments, the encoder 18 may simply be configured to attenuate or control the light source 22 to switch on and off so as to transmit the single photon required for QKD. This step may be at the beginning, during, and/or at the end of classical data communication by the data transmitter 20 and may be done in a pre-determined and/or random fashion.

The classical data transmitter 20 may be a conventional classical data transmitter operable to receive, from a suitable source, data to be communicated over the communication medium 16 and provide the same to the light source 22 for transmission in accordance with generally accepted optical communication methodologies.

In one example embodiment, the light source 22 is in the form of a laser, for example, an 850 nm vertical-cavity surface-emitting laser (VCSEL). However, other suitable light sources may be used.

It will be understood by those skilled in the field of invention that though the transmitter arrangement 12 may operate the encoder 18 and the transmitter 20 in an alternating fashion, i.e., a single photon is transmitted and then classical data is subsequently transmitted over the medium 16, nothing precludes the transmitter 12 from transmitting the single photon required for QKD as well as the classical data carrying light beam simultaneously over the medium 16, for example, by using different wavelengths, respectively, for said transmission.

In any event, the arrangement 12 further comprises one or more suitable optical elements 24 in the form of one or more of holograms, lenses, plates such as wave plates, q plates, polarisation gratings, beam splitters, and other optical devices, etc. operable to facilitate the transmitter arrangement 12 transmitting data and single photons across the medium 16 in various modes. In particular, the arrangement 12 is configured to transmit a single photon, at a time, having a particular quantum state across the communication medium 16 using a quantum mode set, and transmit classical data bits via a classical light beam over the same communication medium 16 using a classical mode set, wherein the quantum mode set and the classical mode sets comprise non-separable modes in common.

The non-separable modes which the quantum and classical mode sets have in common may be comprised of two degrees of freedom (DoF) of the quantum state of the single photon and the classical light, respectively. For example, two selections from the polarisation, spatial mode, and wavelength. In one example embodiment, there may be two spatial modes. In other words, the non-separable modes may be comprised of two DoFs which cannot be separated from each other. The non-separable modes are selected such that the resulting spatial modes to be used are natural modes of the communication medium. For example, natural modes for where the communication medium is an optical fibre or free space. It will be appreciated that in one example embodiment, the vector modes are common to both media.

It will be noted that the DoF may be understood to be an independent control variable.

Differently stated, the classical mode set has two degrees of freedom, at least a first degree of freedom in common with the quantum mode set, and a second degree of freedom invariant to perturbations associated with the communication medium. However, in some example embodiments, the classical mode set may have both first and second degrees of freedom in common with the quantum mode set. On the other hand, the quantum mode set comprises modes selected from a group of modes from a Hilbert space spanned by the first and second degrees of freedom associated with the classical mode set. In particular, the quantum mode set is selected such that the first degree of freedom forms orthogonal modes, and the combined first and second degrees of freedom form mutually unbiased modes, or vice versa.

To this end, it will be noted that the same optics 24 may be used by the transmitter arrangement 12 to encode both classical and quantum modes, including both the non-separable modes and the separable modes.

Turning now to the receiver arrangement 14, the arrangement 14 may comprise an avalanche photodiode 26 configured to receive optical signals transmitted by the transmitter arrangement 12. To this end, the photodiode 26 may be coupled to a suitable bias controller 28 configured to operate the photodiode 26 to receive the single photon transmitted by the transmitter arrangement 12, for example, by operating the photodiode 26 in a "Geiger" mode, and to operate the photodiode 26 in a linear manner to receive the classical light beam in a conventional fashion. In this way, the light source 22, and the photodiode 26 may be operated to work in both classical and quantum communication regimes.

The arrangement 14 may also comprise a suitable QKD decoder 30 and classical data receiver 32, wherein the QKD decoder 30 is configured to determine whether a received photon has a quantum state that is in accordance with a predetermined conventional QKD protocol, etc. The data receiver 32 may be of the form of a conventional classical data receiver operable to receive and process the data transmitter by the transmitter arrangement 12.

Also illustrated generally, the receiver arrangement 14 may comprise suitable optical elements or optics 34 in the form of one or more of holograms, lenses, wave plates, q plates, polarisation gratings, beam splitters, and other optical devices, etc. to facilitate the arrangement 14 detecting and/or decoding the various quantum and classical modes of the incoming photons and classical light generated by the transmitter arrangement 12 and transmitted over the medium 16. To this end, the optical elements 34 may be matched to the optical elements 24 in a complementary fashion so as to detect and/or decode the quantum and classical modes, wherein the optical elements 34 are comprised of a common set of detection optics that are able to distinguish non-separable modes and the separable mode from each other.

The quantum and classical mode sets described above allows for the same optical elements 24, 34 to be used for the classical and quantum transmission and detection, and for the information to be sent over the same medium 16. Moreover, as will be described below, this choice of mode set allows for the real-time error correction of the quantum communication through any perturbing medium, for example, free-space or fibre, thus ensuring a low error rate in conditions such as those found in long distance channels.

Though a general example embodiment of the system 10 is described above with reference to FIGS. 1 and 2, it will be appreciated that the invention as described herein may be implemented in various ways whilst still preserving the principle that the classical mode set and the quantum mode set have non-separable modes in common. One example embodiment, whereby the two DoFs are OAM (orbital angular momentum) and polarisation, will be discussed in greater detail herein. However, it will be understood by those skilled in the field of invention that OAM and polarisation as the two DoFs may be replaced with other DoFs, provided of course that other such DoFs of the quantum and classical mode sets have non-separable modes, particularly a set of non-separable modes, in common as described above.

In any event, in the case whereby the two DoFs are spatial mode and polarisation, the classical light beam is in the form of various vector beams, and quantum communication is achieved through scalar and vector modes. In this regard, it will be noted that the polarisation DoF has previously been used in classical communication as an additional channel in polarisation multiplexing, and in quantum communication to encode quantum bits (qubit). The polarisation DoF is described by two orthogonal states that form a basis for the polarisation space; these are the left-circular $|L\rangle$ and right-circular polarisation $|R\rangle$, i.e., $H_o = \text{span}\{|L\rangle, |R\rangle\}$.

In general, it will be noted that a spatial DoF, e.g., space spanned by modes $m_1$ and $m_2$ may also be used for classical and quantum communication, provided the modes $m_1$ and $m_2$ are orthogonal. Depending on the application and/or design considerations the modes $m_1$ and $m_2$ may be Hermite-Gaussian modes, Laguerre-Gaussian modes, OAM modes, or any other mode from a set with benefits in relation to the channel and communication system.

For brevity, reference will be made to an example embodiment whereby the modes $m_1$ and $m_2$ are OAM modes, though it will be understood by those skilled in the field of invention that the description which follow may be applicable to example embodiments wherein the modes $m_1$ and $m_2$ are Hermite-Gaussian modes, Laguerre-Gaussian modes, OAM modes, or any other mode from a set with benefits in relation to the channel and communication system.

Figure 3:
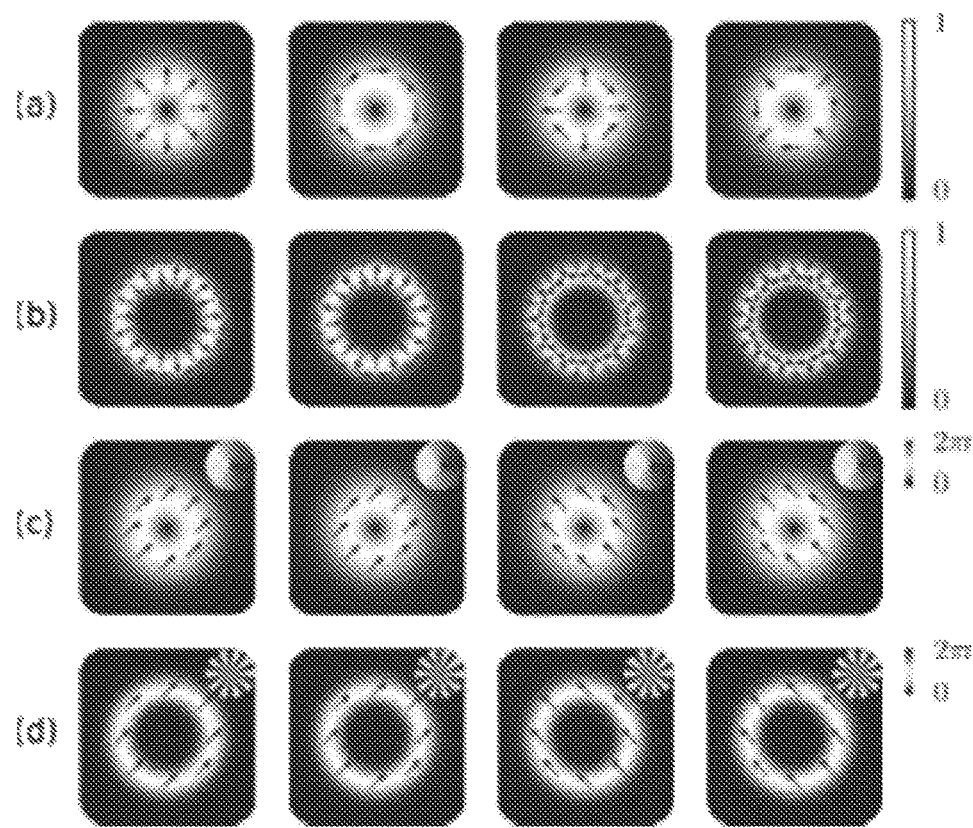
FIG. 3 (a-d) show, graphically, various modes in four-dimensional hybrid OAM-polarisation space.

In the case of where the modes $m_1$ and $m_2$ are OAM modes, the modes may be $|l\rangle$ and $|-l\rangle$ i.e. $H_l = \text{span}\{|l\rangle, |-l\rangle\}$, where l can take any integer value. Thus, by combining the polarisation and OAM DoFs, it is possible to describe a space larger than that of the individual DoFs, for finite l values, i.e., $H_{o,l} = H_o \otimes H_l$. It is important to note that since the OAM is infinitely large ($l \in \mathbb{Z}$), the hybrid polarisation-OAM space is also infinitely large and opens the possibility of infinite dimensional encoding, in principle. In this hybrid space, vector modes $|\Psi\rangle_{l,\theta}$ and scalar modes $|\phi\rangle_{l,\theta}$, may be defined as follows $$|\Psi\rangle_{l,\theta} = \frac{1}{\sqrt{2}}(|R\rangle|l\rangle + e^{i\theta}|L\rangle|-l\rangle), \quad (1)$$

$$|\phi\rangle_{l,\theta} = \frac{1}{\sqrt{2}}\left(|R\rangle|l\rangle + e^{i\left(\theta - \frac{\pi}{2}\right)}|L\rangle|l\rangle\right), \quad (2)$$

wherein each photon carries $l\hbar$ quanta of OAM, and $\theta = [0, \pi]$ is the intra-modal phase. These vector and scalar modes may be generated, at the quantum and classical level, by manipulating the dynamic or geometric phase of light with suitable wave plates and q-plates as is well known in the art. For example, one may use q-plates to couple the polarisation and orbital angular momentum (OAM) DoFs through geometric phase control such that $$|l, L\rangle \xrightarrow{q-plate} |l+l', R\rangle, \quad (3)$$

$$|l, R\rangle \xrightarrow{q-plate} |l-l', L\rangle, \quad (4)$$

where $l' = 2q$ is the topological charge of the q-plate. By transforming an input linearly polarised Gaussian mode ($l=0$) with quarter- or half-wave plates and q-plates, it is possible to produce any scalar or vector modes defined as in Eqs. 3 and 4, producing either separable (scalar) or non-separable (vector) superpositions of qubit states in Eqs. 3 and 4. Now it is possible to employ both vector and scalar modes to realise QKD in four dimensions, with the four vector vortex modes as $$|00\rangle_v = \frac{1}{\sqrt{2}}(|R\rangle|l\rangle + |L\rangle|-l\rangle), \quad (5)$$

$$|01\rangle_v = \frac{1}{\sqrt{2}}(|R\rangle|l\rangle - |L\rangle|-l\rangle), \quad (6)$$

$$|10\rangle_v = \frac{1}{\sqrt{2}}(|L\rangle|l\rangle + |R\rangle|-l\rangle), \quad (7)$$

$$|11\rangle_v = \frac{1}{\sqrt{2}}(|L\rangle|l\rangle - |R\rangle|-l\rangle), \quad (8)$$

with corresponding mutually unbiased basis (MUB) as $$|00\rangle_s = \frac{1}{\sqrt{2}}(|D\rangle|-l\rangle), \quad (9)$$

$$|01\rangle_s = \frac{1}{\sqrt{2}}(|D\rangle|l\rangle), \quad (10)$$

$$|10\rangle_s = \frac{1}{\sqrt{2}}(|A\rangle|-l\rangle), \quad (11)$$

$$|11\rangle_s = \frac{1}{\sqrt{2}}(|A\rangle|l\rangle), \quad (12)$$

where the subscripts s and v refer to, respectively, the scalar and vector mode basis, while D and A are the diagonal and anti-diagonal polarisation states. By way of example, vector and scalar modes in the $l=\pm1$ and $l=\pm10$ OAM subspaces are shown graphically in FIG. 3. In particular, FIG. 3 shows modes in a four-dimensional hybrid OAM-polarisation space. Vector vortex modes for (a) $l=\pm1$ and (b) $l=\pm10$, with the mutually unbiased scalar modes also for the (c) $l=\pm1$ and (d) $l=\pm10$ subspaces. The insets show the azimuthally varying phase profile of the scalar modes, wherein the arrows represent the polarisation state at various spatial positions.

Figure 4:
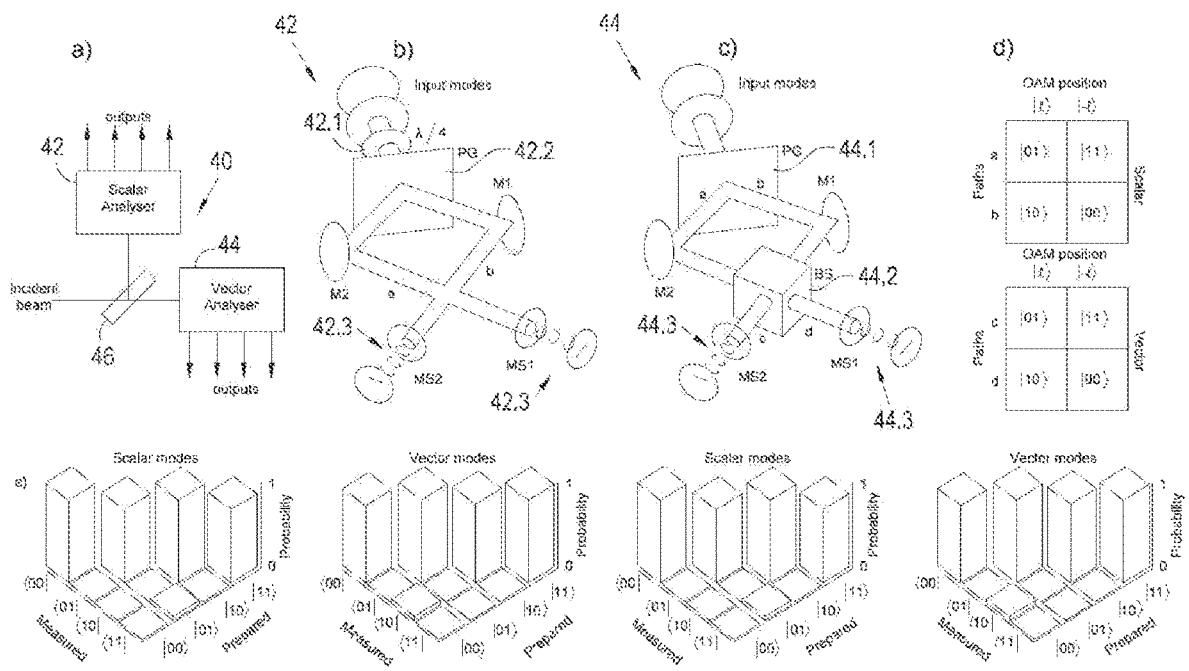
FIG. 4 (a-c) show schematic diagrams of a detector forming part of a receiver arrangement in accordance with an example embodiment of the invention.

Referring now also to FIG. 4 of the drawings where in FIG. 4(a) a high level block diagram of a detector, for example, forming part of the receiver arrangement 14, particularly the part of the optic 34, is generally indicated by reference numeral 40.

To fully benefit from the increased state space, the detector 40, deterministically and without dimension dependent sifting loss, is operable to detect all basis elements in the above-described high-dimensional space with, in principle, unit probability. This differs from previous schemes and detectors that have used mode filters as detectors, sifting through the space one mode at a time, thus removing all benefit of the dimensionality of the space. This is particularly important for quantum key distribution (QKD) where the rate at which the encryption key is generated is dependent on the detection efficiency.

It will be appreciated that for a vector mode as defined in Eq. 1, it is trivial to measure vector states at the classical level with many photons using a filter based method. However, implementing the same method at the single photon level is inefficient because the detection probability is affected by the number of modes that can be measured at once (using a filter, only one mode can be measured at the time).

To this end the detector 40 comprises a scalar anaylser 42 and a vector analyser 44 which receives inputs from a beam splitter 46 configured to receive an incident beam from the transmitter arrangement 12.

The vector analyser 44 (as further illustrated in FIG. 4 (c)) is configured to sort the different vector modes through a combination of geometric phase control and multi-path interference. In particular, the analyser 44 comprises a polarisation grating 44.1, a 50:50 beam splitter (BS) 44.2 and mode sorters 44.3. Based on geometric phase, the grating 44.1 acts as a beam splitter for left- and right-circularly polarised photons, creating two paths $$|\Psi\rangle_{l,\theta} = \frac{1}{\sqrt{2}}(|R\rangle_a |l\rangle_a + e^{i\theta}(|L\rangle_b |-l\rangle_b), \quad (13)$$

where the subscript a and b refer to the polarisation marked paths. The photon paths a and b are interfered at the BS 44.2, resulting in the following state after the BS 44.2:

$$|\Psi'\rangle_{l,\theta} = \frac{1+e^{i(\delta+\theta+\frac{\pi}{2})}}{2}|l\rangle_c + i\frac{1+e^{i(\delta+\theta-\frac{\pi}{2})}}{2}|-l\rangle_d, \quad (14)$$

where the subscripts c and d refer to the output ports of the beam splitter and $\delta$ is the dynamic phase difference between the two paths. It will be noted that the polarisation of the two paths is automatically reconciled in each of the output ports of the BS 44.2 due to the difference of parity in the number of reflections for each input arm. Also, it will be further noted that at this point it is not necessary to retain the polarisation kets in the expression of the photon state since the polarisation information is contained in the path. By setting $\delta=\pi/2$, the state in Eq. 14 is reduced to:

$$|\Psi'\rangle_{l,\theta} = \frac{1-e^{i\theta}}{2}|l\rangle_c + i\frac{1+e^{i\theta}}{2}|-l\rangle_d \quad (15)$$

The measurement system is completed by passing each of the outputs in c and d through a mode sorter 44.3 and collecting the photons using 4 fibres coupled to avalanche photodiodes 26 (though only one was shown in FIG. 1 for ease of illustration). Note that for purposes of experimentation and discussion, only 4 fibres were used because vector modes of a fixed OAM subspace was considered. However, in principle an array of N fibres may be used depending on the efficiency of the mode sorter 44.3 and the number of OAM subspaces used. With the approach described herein, each vector state is detected with, in principle, unit probability at the single photon level. For example, consider the modes $|00\rangle$ and $|01\rangle$, where $\theta=0$ and $\theta=\pi$, respectively. The mapping is such that $$|00\rangle \to |\Psi'\rangle_{l,0} = i|-l\rangle_d, \quad (16)$$

$$|01\rangle \to |\Psi'\rangle_{l,\pi} = -|l\rangle_c, \quad (17)$$

where the indices c and d label the output ports the BS. Through this path interference, the vector modes are mapped as follows: $|\Psi'\rangle_{\pm l,0} \to i|\mp l\rangle$ in port d, while $|\Psi'\rangle_{\pm l,\pi} \to -|\pm l\rangle_d$ in port d. The modes are subsequently differentiated according to the OAM charge they carry in each output port c and d, using an OAM mode sorter 44.3 as will be described below. Sample results of this sorting are shown in FIG. 4 (d). Thus it follows that the combination of path (c or d) and lateral location (+l or −l) uniquely determines the original vector mode.

The scalar mode analyser 42 (see FIG. 4 (b)) of the detector 40 works on an analogous principle as the vector analyser 44 described above. However, without the need of the BS 44.2 to resolve the intermodal phases. The analyser 42 comprises a quarter wave plate 42.1 which resolved the polarisation states of the input beam passing therethrough by performing a unitary transformation that maps linear to circular basis, and passing the scalar modes through the polarisation grating 42.2 which is substantially similar to the grating 44.1.

The analyser 42 may also comprise mode sorters 42.3, which may be substantially similar to the mode sorters 44.3 to sort OAM states. It will be appreciated that where applicable, and appropriate, the analysers 42 and 44 may share resources.

A graphical illustration of the experimental performance of both the scalar and vector analysers 42, 44 is shown in FIG. 4 (e), where modes from the $l=\pm 1$ and $l=\pm 10$ subsets were measured with high fidelity (close to unity).

Referring to FIG. 5 of the drawings, the mode sorters 42.3, 44.3 may be refractive (lossless) aspheres that map OAM to position or any other manifestation of the desired phase transformation. They may be configured to perform a geometric transformation on OAM modes such that azimuthal phase is mapped to a transverse phase variation, i.e., a tilted wavefront. In one example embodiment, the mode sorters 42.3, 44.3 may comprise a first optical element 46, a second optical element 48 and a Fourier lens 49. The first optical element 46 may be configured to perform a conformal mapping in the standard Cartesian coordinates, from a position in the input plane (x; y) to one in the output plane (u; v), such that $$u = \frac{d}{2\pi}\arctan\left(\frac{y}{x}\right) \quad (18)$$

$$v = \frac{d}{2\pi}\ln\left(\frac{\sqrt{x^2+y^2}}{b}\right) \quad (19)$$

where d is the aperture size of the free form optics and b is a scaling factor that controls the translation of the transformed beam in the u direction of the new coordinate system. The result is that after passing through the second phase-correcting optical element 48 and then the Fourier transforming lens 49 (of focal length f), the input OAM (l) is mapped to output positions, $X_l$, following $$X_l = \frac{\lambda f l}{d} \quad (20)$$

This conformal mapping of ring to line to point (using cylindrical lenses), is shown in FIG. 5. A summary of the scalar and vector detection is shown in Table I.

TABLE I

Mode detection paths and respective positions of the spots after the mode sorter

| Mode | Path | Spot position |
| --- | --- | --- |
| $\|\Psi\rangle_{l,0}$ | c | $X_l$ |
| $\|\Psi\rangle_{l,\pi}$ | d | $X_l$ |
| $\|\Psi\rangle_{-l,0}$ | c | $X_{-l}$ |
| $\|\Psi\rangle_{-l,\pi}$ | d | $X_{-l}$ |
| $\|\phi\rangle_{l,0}$ | a | $X_l$ |
| $\|\phi\rangle_{l,\pi}$ | b | $X_l$ |
| $\|\phi\rangle_{-l,0}$ | a | $X_{-l}$ |
| $\|\phi\rangle_{-l,\pi}$ | b | $X_{-l}$ |

Note that above vector and scalar detector work for both classical and quantum, vector and scalar states, making them suitable for application in a hybrid classical-quantum communication system 10 as described herein.

Referring now to FIGS. 6 and 7 of the drawings where high level flow diagrams of example methods in accordance with the invention are illustrated. It will be noted that though the example methods are described with reference to the system 10, as described herein, they may be applied to other systems not illustrated as well.

Referring to FIG. 6 of the drawings, a high level block flow diagram of a method for hybrid classical-quantum communication using spatial modes of light in accordance with an example embodiment of the invention is generally indicated by reference numeral 50. The method 50 typically comprises steps of selecting, at blocks 52 and 54, a classical and quantum mode set for classical communication via a classical light beam and quantum communication, wherein the classical and quantum mode sets are selected to comprise non-separable modes or mode sets in common as described above.

Prior to the transmission of the classical light beam, comprising classical data bits, the method 50 comprises transmitting, at block 56, a single photon having a particular quantum state, via the transmitter arrangement 12 over the communication medium 16. To this end, the method 50 may comprise the step of attenuating the light source 22 of the arrangement 12 so as to transmit the single photon having a particular quantum state via suitable optics 24. In one example embodiment, the QKD encoder 18 at the transmitter arrangement 12, or "Alice", may randomly determine the optics 24 to use for the transmission of the single photon and hence the mode to the receiver arrangement 14, or "Bob", in accordance with conventional QKD methodologies. It will be appreciated that the quantum mode from the quantum mode set selected to transmit the photon determines the quantum state thereof.

The method 50 may then comprise transmitting, at block 58, the classical light beam comprising classical data bits using classical modes from the classical mode set over the same communication medium by way of the transmitter 20 in a conventional fashion, typically by using the same optics 24 used for transmitting the single photon. It follows that the light source 22 is operated in a conventional non-attenuated manner for this step.

The method 50 may further comprise detecting, at block 59 via the receiver arrangement 14, both transmitted classical and quantum modes with a common set of detection optics 34 that are able to distinguish non-separable modes and separable modes from each other. The method 50 may thus comprise operating the avalanche diode 26 in a "Geiger" mode to detect photons and linear mode to detect the classical light beam. At the detection end, it will be appreciated that the receiver arrangement 14, or "Bob" randomly selects to measure incoming photons before, after, or during the detection of classical data bits.

Should the two DoFs be OAM and polarisation as described above, the detection step 59 may be accomplished by way of the detectors 42, 44 in a manner as described above.

As alluded to above, the selection of the modes as described herein allows for real-time error correction of quantum communication through a perturbing medium 16. In this regard, it will be noted that in a communication medium/channel such as free-space and fibre, spatial modes are adversely affected by perturbations (such as turbulence in free space, impurities, bends and imperfections in fibres) that induce scattering among spatial modes and reduce the probability of detecting photons. It follows that process tomography is an essential tool to obtain knowledge about the action of a channel in general. At the single photon level, this characterisation is difficult to do, especially with entangled states: one needs the quantum link to work before it can be characterised, but having it characterised would be immensely helpful in getting it to work.

Due to the equivalence between classical and quantum entanglement, as far as characterising the channel is concerned, vector modes, may be used to characterise quantum correlations (single photon level) via tomography of the classical beam (comprised of many photons as mentioned above). In this way, channel data associated with the channel used for both quantum and classical communication may be obtained. In one example embodiment, the channel data may comprise a channel matrix M as described below. The benefit of having many photons is that tomography of the classical beam can be performed as a single shot measurement using demultiplexing digital holograms.

Thus considering a pair of photons entangled in the OAM degree of freedom, of which one is sent through a perturbing channel, considering an example of a turbulent atmosphere, under the action of the channel, the two-photon state $|\Psi_{in}\rangle$ is transformed into:

$$\sum_{l'} p_{l-l'} |l'\rangle |-l'\rangle + \sum_{l'} p'_{-l-l'} |-l'\rangle |l\rangle \qquad (21)$$

where the p and p' coefficients are modal weightings and $|\Psi_{in}\rangle = (|l\rangle|-l\rangle + |-l\rangle|l\rangle)/\sqrt{2}$. Post-selecting the states of a given 1/1 subspace results in the following output state $$|\Psi_{out}\rangle = p_0|l\rangle|-l\rangle + p_{2l}|-l\rangle|-l\rangle + p_{-2l}'|l\rangle|l\rangle + p_0'|-l\rangle|-l\rangle \qquad (22)$$

It has previously been shown in the field of invention that the mapping from the input to the output state is represented by the non-unitary transformation $M \otimes \mathbb{1}$, where M is the following Kraus operator:

$$M = p_0|l\rangle\langle l| + p_{2l}|-l\rangle\langle l| + p_{-2l}'|l\rangle\langle -l| + p_0'|-l\rangle\langle -l| \qquad (23)$$

Factoring out a global phase in Eq. 23 yields:

$$M = |p_0||l\rangle\langle l| + |p_{2l}|e^{i\theta_1}|-l\rangle\langle l| + |P_{-2l}'|e^{i\theta_2}|l\rangle\langle -l| + |p_0'|e^{i\theta_3}|-l\rangle\langle -l| \qquad (24)$$

The amplitude of each coefficient $p_k$ is given by $$|p_0| = \sqrt{P_{l,-l}}, \qquad (25)$$

$$|p_{2l}| = \sqrt{P_{-l,-l}}, \qquad (26)$$

$$|p_{-2l}'| = \sqrt{P_{l,l}}, \qquad (27)$$

$$|p_{-0}'| = \sqrt{P_{-l,l}}, \qquad (28)$$

where $P_{m,n}=\text{Tr}(|m\rangle\langle m|\otimes|n\rangle\langle n|\rho_{out})$ is a projection of the two-photon state.

To obtain the phase information, one requires the following OAM superposition states: $|+\rangle=(|l\rangle+|-l\rangle)/\sqrt{2}$ and $|-\rangle=(|l\rangle+i|-l\rangle)/\sqrt{2}$. The intermodal phases are then reconstructed as follows:

$$\theta_1 = \arctan\left(\frac{2P_{-,-l}-|p_0|^2-|p_{2l}|^2}{2P_{-,-l}-|p_0|^2-|p_{2l}|^2}\right), \quad (29)$$

$$\theta_2 = -\arctan\left(\frac{2P_{l,-}-|p_0|^2-|p_{-2l}|^2}{2P_{l,+}-|p_0|^2-|p_{-2l}|^2}\right), \quad (30)$$

$$\theta_2 - \theta_3 = -\arctan\left(\frac{2P_{+,l}-|p_{2l}|^2-|p_{-2l}|^2}{2P_{-,l}-|p_{2l}|^2-|p_{-2l}|^2}\right), \quad (31)$$

It may be submitted that the channel matrix M may be obtained from classically entangled light by sending, in the same communication channel for both classical and quantum communication, for example, a turbulent communication channel, a vector beam. The vector beam may have two polarisation states. For example, the vector beam may be of the form $|\Psi_l^+\rangle=(|l\rangle|R\rangle+|-l\rangle)|L\rangle)/\sqrt{2}$, where $|R\rangle$ and $|L\rangle$ are the right and left circular polarisation eigenstates, respectively. After propagation through the same channel, the output classical state, projected onto a given OAM subspace using the Kraus operator in Eq. 23, is given by $$|\Psi_{out}\rangle=p_0|l\rangle|R\rangle+p_{2l}|-l\rangle|R\rangle+p_{-2l}'|l\rangle|L\rangle+p_0'|-l\rangle|L\rangle \quad (32)$$

Here, the amplitude of the $p_k$ coefficients are measured as follows:

$$|p_0|=\sqrt{P_{l,R}}, \quad (33)$$

$$|p_{2l}|=\sqrt{P_{-l,R}}, \quad (34)$$

$$|p_{-2l}'|=\sqrt{P_{l,L}}, \quad (35)$$

$$|p_0'|=\sqrt{P_{-l,L}}, \quad (36)$$

Defining the following polarisation superposition states $|H\rangle=(|L\rangle+|R\rangle)/\sqrt{2}$ and $|D\rangle=(|L\rangle+i|R\rangle)/\sqrt{2}$. The intermodal phases are given as follows:

$$\theta_1 = \arctan\left(\frac{2P_{-,R}-|p_0|^2-|p_{2l}|^2}{2P_{+,R}-|p_0|^2-|p_{2l}|^2}\right), \quad (37)$$

$$\theta_2 = -\arctan\left(\frac{2P_{l,D}-|p_0|^2-|p_{-2l}|^2}{2P_{l,H}-|p_0|^2-|p_{-2l}|^2}\right), \quad (38)$$

$$\theta_2 - \theta_3 = -\arctan\left(\frac{2P_{-,L}-|p_{2l}|^2-|p_{-2l}|^2}{2P_{+,L}-|p_{2l}|^2-|p_{-2l}|^2}\right). \quad (39)$$

Referring now to FIG. 7 of the drawings where another block flow diagram of a method in accordance with an example embodiment is generally indicated by reference numeral 60. The method 60 may comprise, characterising the communication medium, at block 62, by using the above described characterisation scheme to obtain channel data, particularly the channel matrix M.

The method 60 then comprises, using the channel data (matrix M), at block 64, to eliminate errors due to perturbations through real-time error correction.

By way of example, for a given realisation of the turbulence, the Kraus operator M admits the following polar decomposition $$M=U|M|=U(\lambda_0|0\rangle\langle 0|+\lambda_1|1\rangle\langle 1|), \quad (40)$$

where U is a unitary operator and $\lambda_i$ are the eigenvalues of the positive operator $|M|=\sqrt{M^\dagger M}$, with corresponding eigenvector $|i\rangle$. The unitary operator U is computed as follows: $U=M|M|^{-1}$.

The compensation can be achieved using a 'conjugate' filter of the form $$\tilde{M}=|\tilde{M}|U^\dagger=(\lambda_1|0\rangle\langle 0|+\lambda_0|1\rangle\langle 1|)U^\dagger, \quad (41)$$

such that $\tilde{M}M=\lambda_0\lambda_1\mathbb{1}$. The product of eigenvalues, $\lambda_0\lambda_1$, is the probability amplitude of recovering the initial state $|\Psi_l^+\rangle(|\Psi_l^+\rangle)$.

For example, consider the propagation of an input state $|\Psi_l^+\rangle$ through a particular turbulence screen that yields the following output state $$|\Psi_{out}\rangle = 0.53|l\rangle|R\rangle + 0.18e^{\frac{i\pi}{3}}|-l\rangle|R\rangle + 0.24e^{\frac{i\pi}{5}}|l\rangle|L\rangle + \quad (42)$$
$$0.47e^{-\frac{i\pi}{8}}|-l\rangle|L\rangle$$

Note that the probabilities do not add to unity since we are projecting onto a particular OAM subspace. The Kraus operator reads $$M = \begin{pmatrix} 0.47e^{-\frac{i\pi}{8}} & 0.18e^{\frac{i\pi}{3}} \\ 0.24e^{\frac{i\pi}{5}} & 0.53 \end{pmatrix}$$

We denote V and D the matrix of eigenvectors and eigenvalues, respectively, of the operator $M^\dagger M$. The positive operator $|M|$, is computed as follows $$|M| = V\sqrt{D}V^{-1} = \begin{pmatrix} 0.5167 & 0.1069+0.0085i \\ 0.1069-0.0085i & 0.5494 \end{pmatrix}$$

The positive operator $|M|$ admits the following spectral decomposition:

$$M=0.4246|0\rangle\langle 0|+0.6415|1\rangle\langle 1|,$$

where $$|0\rangle = \begin{pmatrix} 0.7584 \\ -0.6497+0.0519i \end{pmatrix}; |1\rangle = \begin{pmatrix} 0.6497+0.0519i \\ 0.7584 \end{pmatrix};$$

The unitary matrix U is given by $$U = M|M|^{-1} = \begin{pmatrix} 0.8356-0.4211i & -0.053+0.3527i \\ 0.1836+0.3012i & 0.9337-0.0615i \end{pmatrix},$$

such that $U^\dagger U=\mathbb{1}$. The positive conjugate filter to apply in the correction is thus $$|\tilde{M}|=0.6415|0\rangle\langle 0|+0.4246|1\rangle\langle 1|,$$

such that $|\tilde{M}||M|=(0.6415\times 0.4246)\mathbb{1}$

As mentioned above, M is the channel data, thus the method step 64 may comprise using M to design or select optics to form part of 24 and/or 34 to implement a correction based thereon. It will be understood that the channel data M is calculated using the classical light and used to fix the quantum link errors for quantum communication. It will be appreciated that in some example embodiments, the system may be configured to autocorrect when the error rate exceeds a predetermined threshold.

With an error free quantum link, the security is ensured and a secret key can be transmitted to encrypt the classical data, which is sent using the same mode set. Thus the final communication system 10 described herein is both fast and secure with a high bit/s rate determined by the number of modes used.

It will be noted that the real-time error correction as described above allows for a very robust system against dynamic fluctuations in the communication medium 16. The present invention further allows for the same preparation and measurement optics to be used in both the classical and quantum transmission, the same light source to be used in both the classical and quantum transmission as described herein, and the same detector is used for both modes of operation as also described herein thereby reducing the cost and complexity of the system. It will be appreciated that the communication link will be secured using conventional cryptography with a highly secure key derived for a conventional QKD algorithm which takes advantage of the high bits/photon key rate determined by the number of modes used. The system as described herein is easy to align due to its classical facet and secure due to its quantum facet. Present classical communication systems may be easily converted to the hybrid system described herein.

The invention claimed is:

1. A method for hybrid classical-quantum communication, the method comprising:
    transmitting a single photon having a particular quantum state over a communication medium using a quantum mode set, wherein the quantum mode set comprises non-separable modes for quantum communication; and
    transmitting a classical light beam over the same communication medium using a classical mode set, wherein the classical mode set comprises non-separable modes for classical communication,
    wherein the classical and quantum mode sets comprise non-separable modes in common.

2. A method as claimed in claim 1, wherein the non-separable modes in common are two degrees of freedom of the quantum state of a single photon, and classical light.

3. A method as claimed in claim 1, wherein the non-separable modes are selected such that resulting classical and quantum modes to be used for classical and quantum communication are natural modes of the communication medium.

4. A method as claimed in claim 1, wherein the classical mode set has two degrees of freedom, at least a first degree of freedom in common with the quantum mode set, and a second degree of freedom.

5. A method as claimed in claim 1, wherein the method comprises using the classical light beam to characterize the communication medium by determining channel data associated therewith, and wherein the method comprises using the determined channel data to correct errors in quantum communication over the communication medium.

6. A method as claimed in claim 2, wherein the method comprises transmitting both the classical and quantum modes with a common set of optics that is able to generate the non-separable modes in common with both degrees of freedom and separable modes associated with one degree of freedom on demand.

7. A method as claimed in claim 1, wherein the classical mode set comprises non-separable and/or separable modes for classical communication, and wherein the quantum mode set comprises non-separable and/or separable modes for quantum communication.

8. A method as claimed in claim 1:
    wherein the method comprises controlling a receiver arrangement to detect the transmitted photon in a predetermined manner; and
    wherein the method comprises directing an incoming classical light beam or single photon to scalar and vector processing paths, wherein in the scalar processing path the method comprises:
        converting linear polarization of the incoming classical light beam or single photon to circular polarization;
        splitting the circularly polarized classical light beam or single photon to two scalar paths based on geometric phase with a suitable polarization grating; and
        sorting scalar modes from outputs of the polarization grating with one or more suitable mode sorters so as to detect scalar modes; and
    wherein in the vector processing path, the method comprises:
        splitting or directing the classical light beam or single photon into two paths based on their polarization using one or a combination of waveplate(s), polarizing beam splitters, and suitable polarization grating(s) based on geometric phase;
        interfering the two paths with a beam splitter; and
        sorting resulting modes from outputs of the beam splitter with suitable mode sorters so as to detect vector modes.

9. A communication system comprising a transmitter arrangement, wherein the transmitter arrangement is configured to:
    transmit a single photon having a particular quantum state over a communication medium using a quantum mode set, wherein the quantum mode set comprises non-separable modes for quantum communication; and
    transmit a classical light beam over the same communication medium using a classical mode set, wherein the classical mode set comprises non-separable modes for classical communication, and wherein the classical and quantum mode sets comprise non-separable modes in common.

10. A communication system as claimed in claim 9, wherein the non-separable modes in common are non-separable degrees of freedom of selected modes of the quantum and classical mode sets used for quantum and classical communication.

11. A communication system as claimed in claim 9, wherein the classical mode set comprises non-separable and/or separable modes for classical communication, and wherein the quantum mode set comprises non-separable and/or separable modes for quantum communication.

12. A communication system as claimed in claim 11, wherein the system comprises a receiver arrangement configured to receive a transmitted single photon and classical beam of light transmitter by the transmitter arrangement and detect both classical and quantum modes with a common set of detection optics.

13. A communication system as claimed in claim 9, wherein the transmitter arrangement comprises a light source for transmitting a classical light beam and a single photon via the same communication medium.

14. A communication system as claimed in claim 12, wherein the receiver arrangement comprises a first 50% reflecting beam splitter configured to direct an incoming classical light beam or single photon to scalar and vector processing paths.

15. A communication system as claimed in claim 14, wherein the receiver arrangement comprises, in the scalar processing path:
    a quarter wave plate in the scalar processing path to convert linear polarization of an incoming classical light beam or single photon to circular polarization;
    a polarization grating, located downstream of the quarter wave plate, configured to split the circularly polarized classical light beam or a single photon to two scalar paths based on geometric phase; and
    suitable scalar mode sorters configured to sort scalar modes from outputs of the polarization grating.

16. A communication system as claimed in claim 14, wherein the receiver arrangement comprises, in the vector processing path:
    one or a combination of waveplate(s), polarizing beam splitters, and suitable polarization grating(s) based on geometric phase configured to split the classical light beam or single photon into two vector paths based on geometric phase;
    a beam splitter configured to intercept outputs from the polarization grating; and
    suitable mode sorters configured to sort vector modes from outputs of the beam splitter so as to detect vector modes.

17. A communication system as claimed in claim 15, wherein the mode sorters comprise:
    a first optical element configured to perform conformal mapping in Cartesian coordinates from a received input;
    a second optical element operable to correct phase of the output from the first optical element; and
    a third optical element in a form of a Fourier transforming lens configured to map the output of the second optical element to output positions.

18. A communication system as claimed in claim 9, wherein the classical mode set has two degrees of freedom, at least a first degree of freedom in common with the quantum mode set, and a second degree of freedom.

19. A method for hybrid classical-quantum communication, the method comprising:
    transmitting a single photon having a particular quantum state over a communication medium using a quantum mode set; and
    transmitting a classical light beam over the same communication medium using a classical mode set,
    wherein the classical and quantum mode sets comprise non-separable modes in common, and wherein the method comprises using the classical light beam to characterize the communication medium by determining channel data associated therewith, and wherein the method comprises using the determined channel data to correct errors in quantum communication over the communication medium.

* * * * *